United States Patent
Lomp et al.

(10) Patent No.: US 6,466,567 B2
(45) Date of Patent: *Oct. 15, 2002

(54) CDMA BASE STATION HAVING AN IMPROVED ANTENNA SYSTEM

(75) Inventors: Gary R. Lomp, Centerport, NY (US); Leonid Kazakevich, Plainview, NY (US); Jeffrey S. Polan, Deer Park, NY (US); David K. Mesecher, Huntington Station, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/073,797

(22) Filed: Feb. 11, 2002

(65) Prior Publication Data

US 2002/0071420 A1 Jun. 13, 2002

Related U.S. Application Data

(63) Continuation of application No. 09/854,725, filed on May 14, 2001, which is a continuation of application No. 08/961,482, filed on Oct. 31, 1997, now Pat. No. 6,259,687.

(51) Int. Cl.$^7$ .............................................. H04B 7/216
(52) U.S. Cl. ..................... 370/342; 370/334; 370/335
(58) Field of Search ................................. 370/334, 335, 370/342

(56) References Cited

U.S. PATENT DOCUMENTS

| | | | |
|---|---|---|---|
| 5,533,011 A | | 7/1996 | Dean et al. |
| 5,633,889 A | | 5/1997 | Schilling |
| 5,726,776 A | | 3/1998 | Lomp |
| 5,742,595 A | * | 4/1998 | Bhagalia ..................... 370/342 |
| 5,757,318 A | | 5/1998 | Reudink |
| 6,031,845 A | * | 2/2000 | Walding ..................... 370/335 |
| 6,222,819 B1 | * | 4/2001 | Lysejko et al. ............. 370/209 |
| 6,259,687 B1 | * | 7/2001 | Lomp et al. ................ 370/334 |

FOREIGN PATENT DOCUMENTS

| | | |
|---|---|---|
| EP | 0863620 | 9/1998 |
| WO | 9724818 | 7/1997 |

OTHER PUBLICATIONS

Kiyohito Tokuda et al.: "Analysis of a Distributed Antenna System and its Performance Under Frequency Selective Fading"—IEICE Transactions on Communications, vol. E77–B, No. 5, May 1, 1994, pp. 606–623, XP000540890, see paragraph 1 and 2.1, Figure 1.

* cited by examiner

Primary Examiner—Mark Zimmerman
Assistant Examiner—Enrique L Santiago
(74) Attorney, Agent, or Firm—Volpe and Koenig, P.C.

(57) ABSTRACT

A CDMA base station includes an antenna system having multiple antennas and delay units for receiving a transmitted signal and outputting a combined signal having a known distortion imparted by the antenna system. The combined signal is in turn processed by a modem, which compensates for the known distortion in a manner which provides improved signal gain. The improved signal gain permits a reduction in transmit power and, accordingly, increased capacity of the base station. Where the antenna system is to be remotely located from related signal processing equipment, separate units for the RF receiver/transmitter and the other signal processing equipment are provided so that the RF receiver/transmitter may also be remotely located along with the antenna system.

24 Claims, 7 Drawing Sheets

CDMA BASE STATION HAVING AN IMPROVED ANTENNA SYSTEM

CROSS REFERENCE TO RELATED APPLICATIONS

This application is a continuation of application Ser. No. 09/854,725; filed on May 14, 2001; which is a continuation of application Ser. No. 08/961,482; filed on Oct. 31, 1997, which issued as U.S. Pat. No. 6,259,687 on Jul. 10, 2001.

BACKGROUND

The present invention relates to wireless digital communication systems. More particularly, the present invention relates to communication stations which employ code-division multiple access (CDMA) technology wherein the station has multiple antennas for increasing the capacity of the CDMA system.

Over the last decade consumers have become accustomed to the convenience of wireless communication systems. This has resulted in a tremendous increase in the demand for wireless telephones, wireless data transmission and wireless access to the Internet. The amount of available RF spectrum for any particular system is often quite limited due to government regulation and spectrum allotments. Accordingly, the need to utilize one's allocated RF spectrum efficiently is desired.

CDMA communication systems have shown promise in the effort to provide efficient utilization of the RF spectrum. At least one brand of CDMA systems, Broadband Code Division Multiple Access™ or B-CDMA™ communication systems available from InterDigital Communications Corporation, permit many communications to be transmitted over the same bandwidth, thereby greatly increasing the capacity of the RF spectrum. In B-CDMA™ brand communication systems, an information signal at the transmitter is mixed with a pseudo random "spreading code" which spreads the information signal across the entire bandwidth which is employed by the communication system. The spread signal is upconverted to an RF signal for transmission. A receiver, identified by the pseudo random spreading code, receives the transmitted RF signal and mixes the received signal with an RF sinusoidal signal generated at the receiver by a first-stage local oscillator to downconvert the spread spectrum signal. The spread information signal is subsequently mixed with the pseudo random spreading code, which has also been locally generated, to obtain the original information signal.

In order to detect the information embedded in a received signal, a receiver must use the same pseudo random spreading code that was used to spread the signal. All signals which are not encoded with the pseudo random code of the receiver appear as background noise to the receiver. Accordingly, as the number of users that are communicating within the operating range of a particular communication station increases, the amount of background noise also increases, making it difficult for receivers to properly detect and receive signals. The transmitter may increase the power of the transmitted signal, but this will increase the noise (interference) as seen by other receivers.

Applicants have recognized the need to decrease the amount of interference in order to increase the capacity (number of users) of the CDMA system.

SUMMARY

A communication station for use in a CDMA communication system is provided with an antenna system which includes a plurality of antennas for receiving CDMA communication signals. The antennas are coupled to a summer, which outputs a summed signal from the antenna system. One of the antennas is directly coupled to the summer. Each of the other antennas is coupled to a respective delay unit which imparts a predetermined fixed delay to the signals received by the respective antennas. Each delay unit is in turn coupled to the summer. The antenna system, accordingly, outputs a summed signal which has a known phase distortion corresponding to the fixed delays imparted by the delay units.

A receiver is coupled to the antenna system summer output, strips the carrier frequency, and passes the resultant summed baseband signal to one or more modems. Where the communication station is designed to receive communications associated with a single dedicated CDMA code, such as a subscriber station, a single modem is preferred. Where multiple communications are to be simultaneously processed, such as in a base station or a subscriber unit which serves multiple users or as an emulated base station, multiple modems are provided.

Each modem is configured to receive an individual communication signal contained within the baseband signal associated with unique CDMA codes. The modems include circuitry for compensating for at least the known signal phase distortion imparted by the delay units. Preferably, each modem includes a vector correlator (also known as a rake receiver) for determining filter coefficients which are passed to an adaptive matched filter (AMF). The AMF is a transversal filter which uses the coefficients to overlay delayed replicas of the signal onto each other to provide a filtered signal having increased signal-to-noise ration (SNR).

The vector correlator/rake receiver has a sufficient capacity to determine filter coefficients over a window of time which is at least as wide as the known delays created by the antenna system. Preferably, three antennas are used, first, second and third. The second antenna's signal is delayed to provide a signal replica with a three-chip delay relative to the signal replica provided by the first antenna. The third antenna's signal is delayed to provide a signal replica having a seven-chip delay relative to the signal replica provided by the first. In order to process the delayed replicas of the signal which originated with the second and third antennas, the vector correlator/rake receiver processes information in at least an eleven chip window. The processing of the fourth and eighth chips within the window, accordingly, provides coefficients to compensate for the distortion imparted by the three- and seven-chip delays of the second and third antenna signals.

The use of rake receivers to compensate for multipath distortion of a CDMA signal is disclosed in U.S. patent application Ser. Nos. 08/266,769 and 08/871,109 which are incorporated herein as if fully set forth. It will be recognized to those who are of skill in the art that the utilization of a rake receiver or a vector correlator will provide compensation for not only multipath distortion, but also for the known distortion imparted by the multi-antenna system disclosed herein.

The gain of the signal output by the AMF is monitored by an automatic power control (APC) which relays messages to the transmitting station to control the power of the transmitted signal. Since the vector correlator or rake receiver compensates for both multipath phase distortion as well as the known distortion imparted by the antenna system, an enhanced gain is realized in comparison to a single antenna system where only multipath phase distortion is compensated for. Accordingly, the relatively higher gain which is received enables the APC to direct the transmitting station to lower its power thus increasing the capacity of the overall CDMA system.

Where the physical site of the communication station requires or makes the location of the antenna system desirable at a location relatively distant to the processing components, applicants' have recognized that significant loss in signal strength can occur. To address this problem the receiver/transmitter (RxTx) may be physically separated from the other processing compartments. The RxTx may then be located in relative proximity to the remotely located antennas and relatively distant to the processing modems. A significant improvement in signal strength is seen by the elimination of twenty feet or more of connecting cable between the antenna system and the RxTx. Accordingly, where remote location of the antenna or antenna system is necessary, at least twenty feet of cable is provided to couple the RxTx to the other signal processing equipment permitting the RxTx to be mounted in closer proximity and coupled to the antenna system with a relatively short cable. Preferably, the signal coupling cable which connects the RxTx to the other signal processing equipment includes DC power to provide power to the RxTx.

Other aspects and advantages will become apparent to those skilled in the art after reading the detailed description of the preferred embodiments.

DESCRIPTION OF THE PREFERRED EMBODIMENTS

Figure 1:
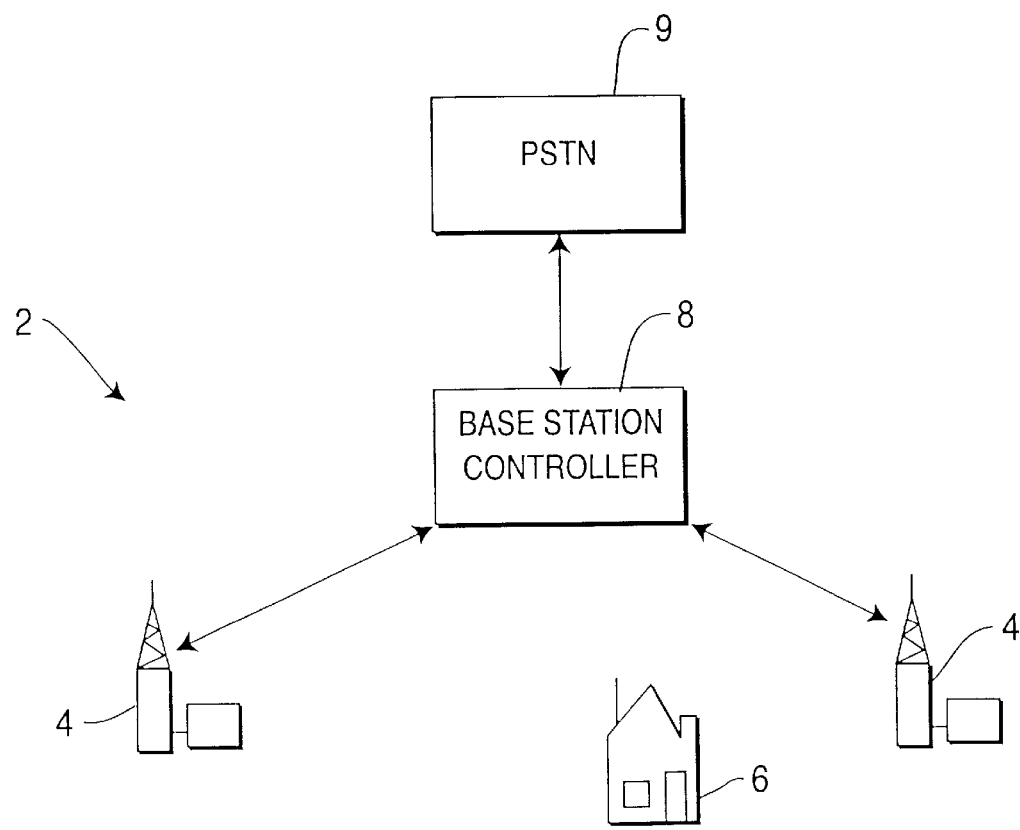
FIG. 1 is a schematic illustration of a communication network embodiment of the present invention.
Figure 1:
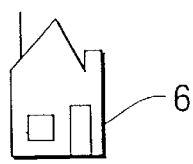
Figure 1:
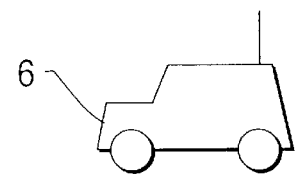
Figure 1:
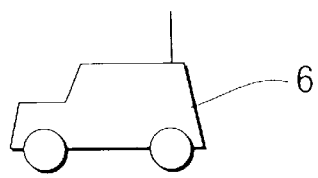

Presently preferred embodiments are described below with reference to the drawing figures wherein like numerals represent like elements throughout.

A communication network 2 embodying the present invention is shown in FIG. 1. The communication network 2 generally comprises one or more base stations 4, each of which is in wireless communication with a plurality of subscriber units 6, which may be fixed or mobile. Each subscriber unit 6 communicates with either the closest base station 4 or the base station 4 which provides the strongest communication signal. The base stations 4 also communicates with a base station controller 8, which coordinates communications among base stations 4. The communication network 2 may also be connected to a public switched telephone network (PSTN) 9, wherein the base station controller 8 also coordinates communications between the base stations 4 and the PSTN 9. Preferably, each base station 4 communicates with the base station controller 10 over a wireless link, although a land line may also be provided. A land line is particularly applicable when a base station 4 is in close proximity to the base station controller 8.

The base station controller 8 performs several functions. Primarily, the base station controller 8 provides all of the operations, administrative and maintenance (OA&M) signaling associated with establishing and maintaining all of the wireless communications between the subscriber units 6, the base stations 4, and the base station controller 8. The base station controller 8 also provides an interface between the wireless communication system 2 and the PSTN 9. This interface includes multiplexing and demultiplexing of the communication signals that enter and leave the system 2 via the base station controller 8. Although the wireless communication system 2 is shown employing antennas to transmit RF signals, one skilled in the art will recognize that communications may also be accomplished via microwave or satellite uplinks.

Figure 2:
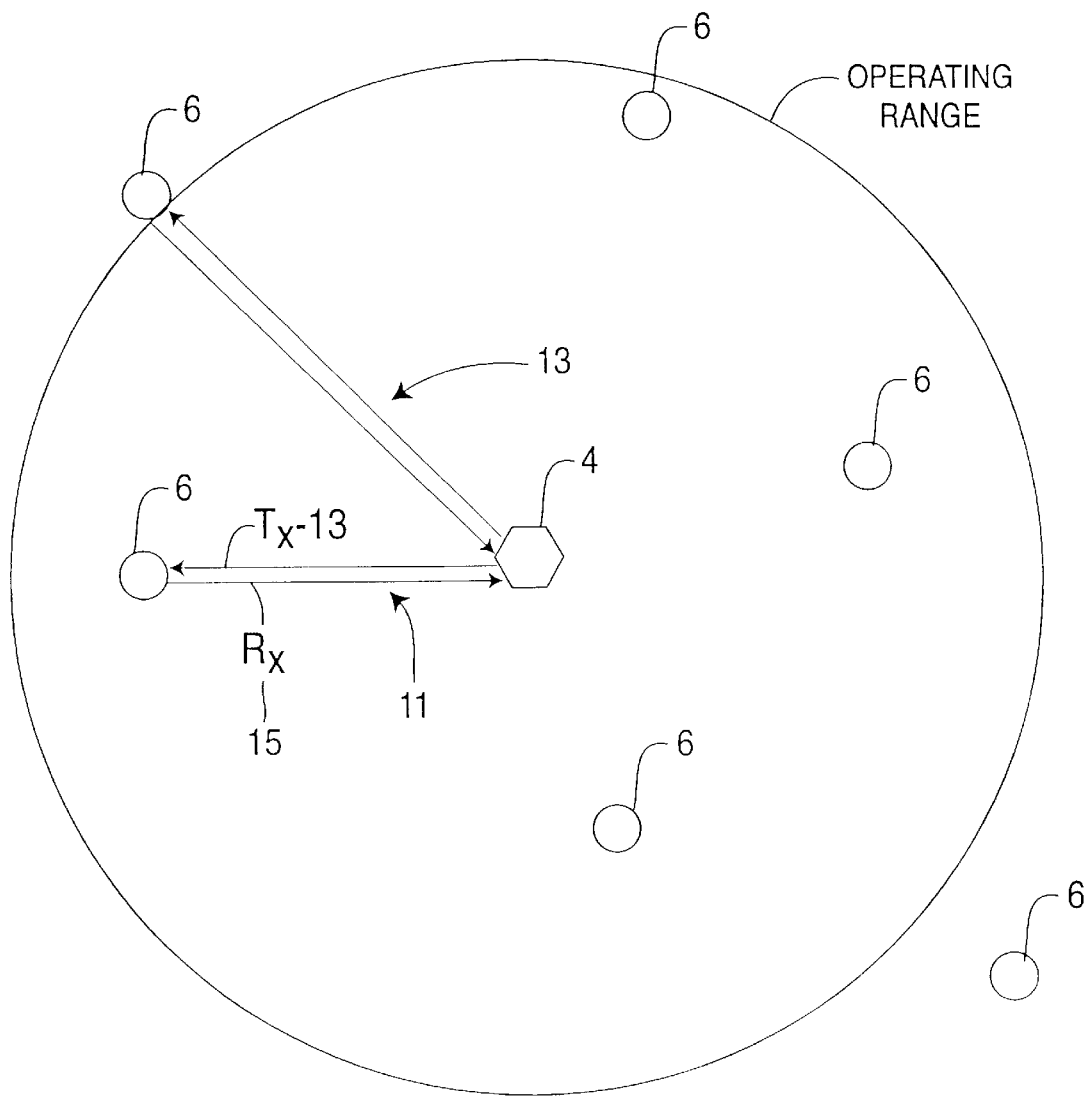
FIG. 2 is a schematic illustration of the propagation of signals between a base station and a plurality of subscriber units.

Referring to FIG. 2, the propagation of signals between a base station 4 and a plurality of subscriber units 6 is shown. A two-way communication channel 11 comprises a signal transmitted 13 (TX) from the base station 4 to subscriber station 6 and a signal received 15 (RX) by the base station 4 from the subscriber unit 6. The signal between the base station 4 and the subscriber unit 6 include the transmission of a pilot signal. The pilot signal is a spreading code which carries no data bits. The pilot signal is used for synchronizing the transmission between the base station 4 and subscriber unit 6. Transmission and reception of data begins after synchronization of the subscriber unit 6 and the base station 4.

Figure 3:
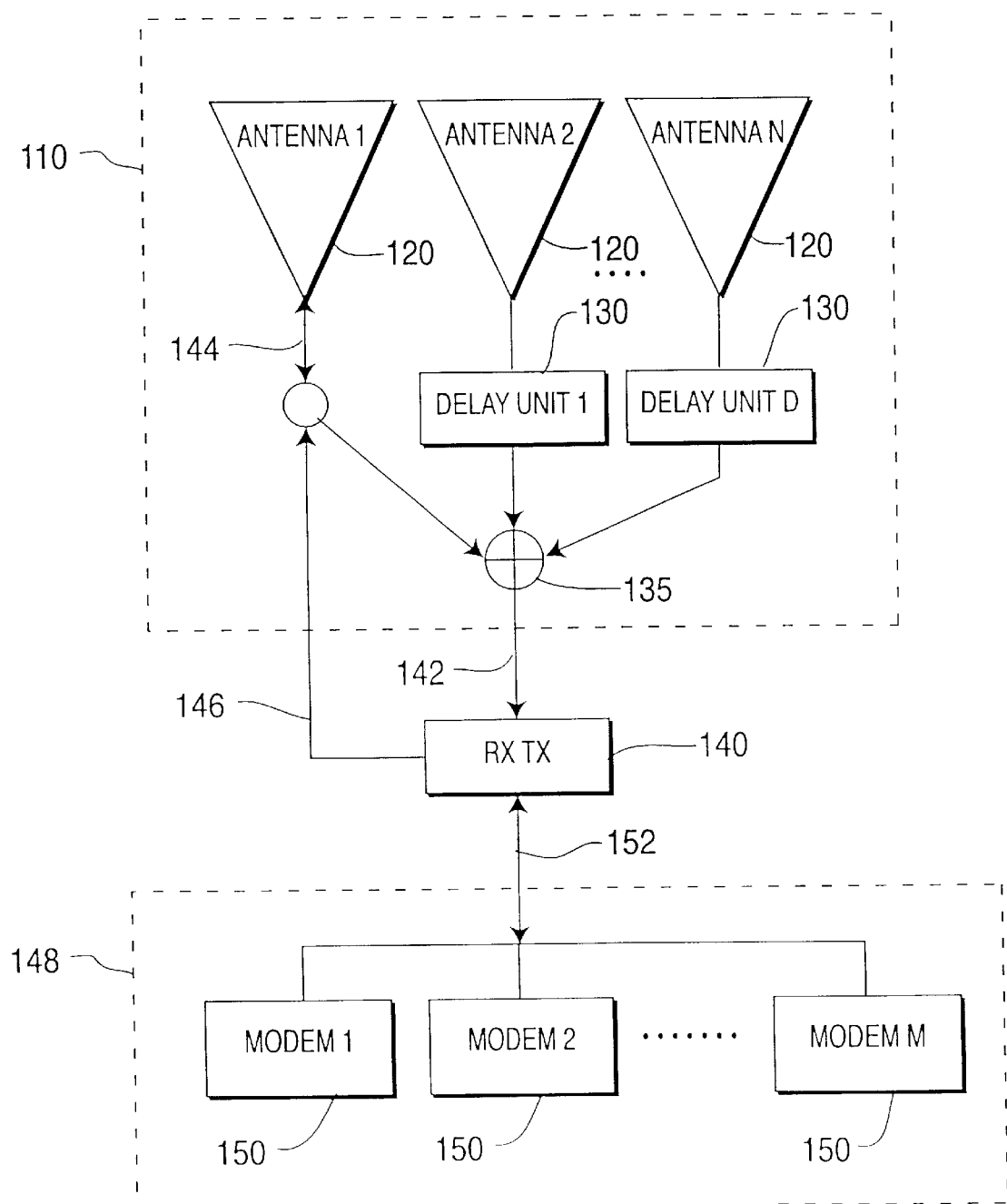
FIG. 3 is a block diagram of a first embodiment of a communication station made in accordance with the teachings of the present invention.

Referring to FIG. 3, a communication station 100, which may be either a base station 4 or a subscriber unit 6, includes an antenna system 110 having a plurality of antennas 120, delay units 130 and a summer 135. The summer 135 is coupled to an RF receiver of a receiver/transmitter (RxTx) unit 140 via a cable 142. An RF transmit output of the RxTx unit 140 is coupled to one of the antennas 120, preferably the first antenna, by a direction coupler 144 and connecting cable 146. The RxTx 140 is connected to signal processing equipment 148 which includes one or more of modems 150 via a cable 152. Preferably, the antenna system 110, RxTx 140 and the other signal processing equipment 148 are in close proximity to each other to inhibit loss of signal strength. However, if it is necessary to place the antenna system 110 in a location remote from the signal processing equipment, for example more than 20 feet away, significant loss in signal level can result during transmission and reception. Applicants have recognized that the susceptibility to loss in signal strength can be significantly reduced by physically separating the RxTx 140 from the other signaling processing components 148 including the modems 150 to permit a relatively short cables 142, 146 to couple the RxTx and the antenna system 110 and a relatively long cable 152 to couple the RF receiver 140 to the other processing equipment 148. Where separation of the units 140, 148 is desirable, preferably, the coupling cable 152 is at least twenty feet long to permit a reduction in the length of cables 142, 146 required to couple the RxTx 140 to the antenna system 110. To facilitate the location of the RxTx 140 in proximity with the antenna system 110, it is preferred that connecting cable 152 provide the DC power to the RxTx 140 from the other processing equipment 148 which includes modems 150. This may be accomplished by overlaying the DC power on the signals to be transmitted.

Separate delay units 130 shift the time-of-arrival of the signal replicas to the receiver. The resulting combined signal will have N copies of the received signal with different time delays wherein N is an integer. Preferably, each delay unit 130 results in a delay of at least two chips which enables further processing to achieve a net increase in signal strength.

The resulting combined signal is output by the summer 135 to the RF receiver of the RxTx 140. The RF receiver of the RxTx 140 strips the carrier frequency and passes a resulting baseband signal to the modems 150. The signal received by each modem 150 has a distortion corresponding to the delays imparted by the delay units 130. The signals may also have distortion attributable to multipath occurring naturally in the channel 120.

As is known in the art, each CDMA communication is associated with a unique code. Multiple modems 150 enable simultaneous processing of multiple CDMA communications, each processing a communication associated with a different CDMA code. For subscriber units a single modem 150 may be used if only a single communication is to be supported at any given time. However, subscriber units may have several modems to support multiple communications or to serve as an emulated base station. As explained below, combining N signals with a known distortion enables the lowering of the transmit power required by the receiving units. As a result, this increases the number of subscribers 6 or the number of simultaneous communications with a base station 4 within the system.

Figure 4:
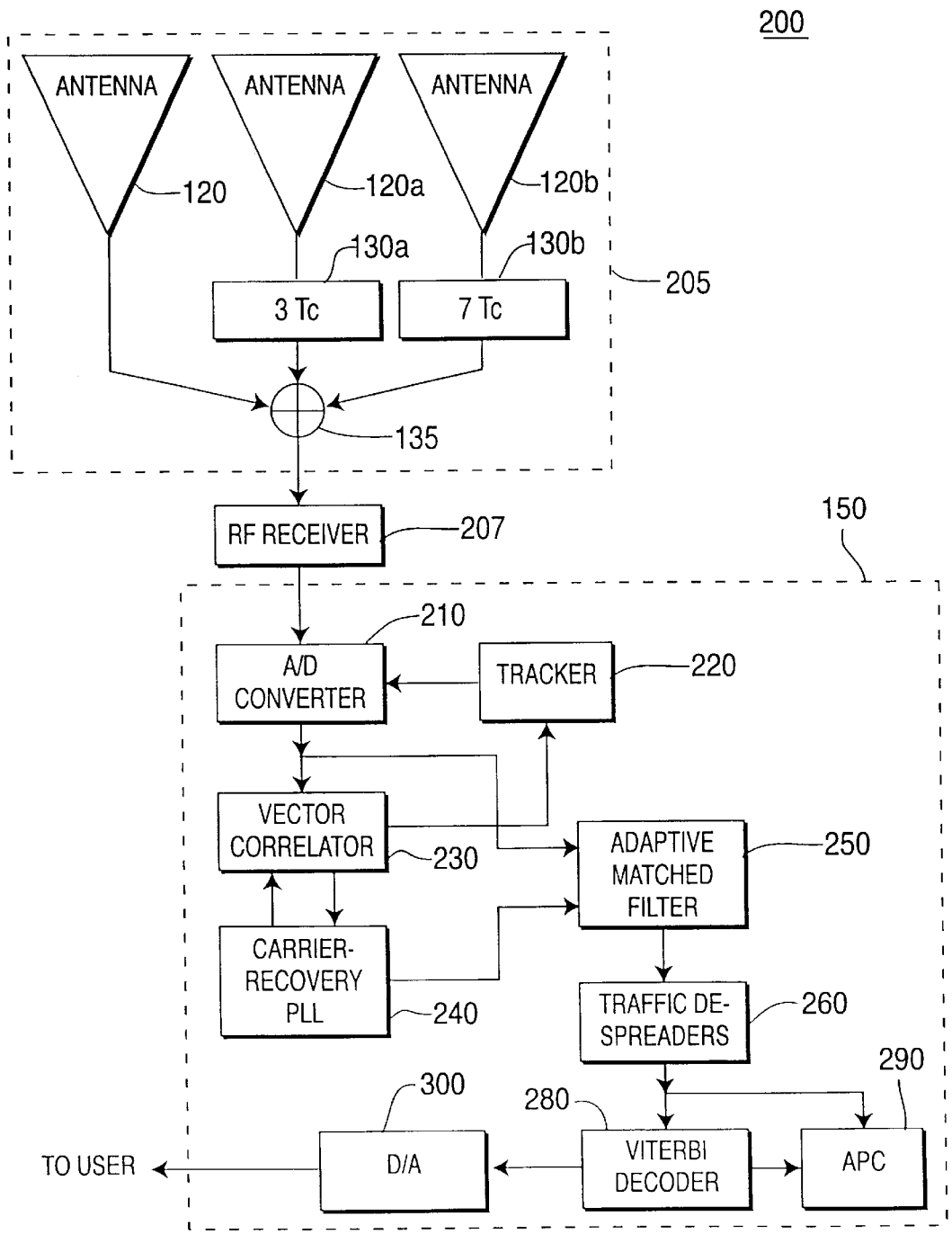
FIG. 4 is a more detailed block diagram of a first embodiment of a communication station made in accordance with the teachings of the present invention.

Referring to FIG. 4, a communication station 200 is illustrated having an antenna system 205 containing three antennas 120, 120a, 120b, two delay units 130a, 130b and one summer 135. This particular configuration permits an increase in up to 4.77 dB of gain in a received signal as compared with a single antenna unit which receives a signal transmitted at the same power. This gain translates into increased capacity (increased subscribers or increased number of simultaneous communications), which can be handled by communication station 200, since the transmit power can be reduced.

The three antennas 120, 120a, 120b are preferably spaced at least six wavelengths apart, or equivalently, a few inches to a few yards from each other so that the antenna diversity gain is avoided by the arrangement. The antennas 120, 120a, 120b are preferably located so as to receive the CDMA communication signals from independent propagation paths.

The summation unit 135 receives a signal from the first antenna 120 with no delay. The summation unit 135 receives a signal from the second antenna 120a via delay unit 130a which imparts a delay of three chips relative to the first antenna's signal. The summation unit 135 also receives a signal from the third antenna 120b via delay unit 130b which imparts a delay of seven chips relative to the first antenna's signal. The signal delay provided is typical, but can be changed by one having ordinary skill in the art, and is influenced by the temporal width of the vector correlator/rake receiver.

The delay units may comprise electronic circuitry, for example a standing acoustic wave (SAW) device, or simply be a selectively extended piece of cable coupling the antennas to the mixer 135, which is selectively extended to provide for desired delay. As explained below, benefits in increased gain are realized as long as the delays imparted are at least two chips and the vector correlator and/or rake receiver which analyzes the distortion has sufficient capacity to analyze the net delays imparted by all of the delay units.

The signal from all three antennas 120, 120a, 120b are added by the summer 135 then passed to an RF receiver 207 to strip the carrier frequency. The resulting baseband signal has three copies of the received communication signal, each copy having a different delay.

The baseband signal output by the receiver 207 is processed by the modems 150. Delayed replicas of the communication signal are essentially combined by overlaying them with the correct phase and amplitude which results in increased gain. This function is performed by an adaptive matched filter (AMF) 250 which operates in accordance with filter coefficients determined by a vector correlator 230 in conjunction with a carrier recovery phase lock loop 240. The three antenna system 110 generally provides a gain of 3 to 4 dB and ideally 4.77 dB as compared to a similar receiving station employing a single antenna. Therefore, there is generally a reduction of 3 to 4 dB in transmit power required to process communication.

The modem 150 includes an analog to digital converter 210 which converts the baseband signal into a digital signal with the assistance of a tracker 220. The tracker 220 directs the digital converter 210 to sample the strongest analog representation of the data being transmitted to the communication station 200 to provide an accurate digital signal. The digital signal includes both a digital data signal and a digital pilot signal.

As is well known in the art, CDMA communication stations receive a pilot signal to provide synchronization of a locally generated pseudo random code with the pseudo random code transmitted by the transmitting station, and to provide a transmission power reference during initial power ramp-up. Typically, a base station transmits the pilot signal to provide synchronization of a locally generated pseudo random code with the transmitted pseudo random code. The pilot signal is a sequence of pseudo random complex numbers which are modulated in this system by constant complex pilot value having a magnitude of one and phase of zero.

The digital pilot signal will have the same phase distortion as the digital data signal, since they are both contained within the baseband signal. Accordingly, the vector correlator 230 receives the pilot signal and determines in conjunction with a phase lock loop 240, filter coefficients based on the distortion of the pilot signal. Hence, the determined coefficients also represent the distortion of the data signal. The data signal/CDMA communication signal, which is directed to the adaptive match filter (AMF) 250, is processed by the AMF in accordance with the filter coefficients generated by the vector correlator in combination with the phase lock loop.

As disclosed in U.S. patent application Ser. Nos. 08/266, 769 and 08/871,109, vector correlators/rake receivers in conjunction with phase lock loop circuitry have been utilized to produce filter coefficients to correct for multi-path distortion. As used in the present invention, the vector correlator and phase lock loop generate filter coefficients associated with both natural multipath distortion and the artificially introduced distortions imparted by the antenna system 130a, 130b, so long as the delays of the antenna system are within the correction window used by the vector correlator 230.

Figure 5:
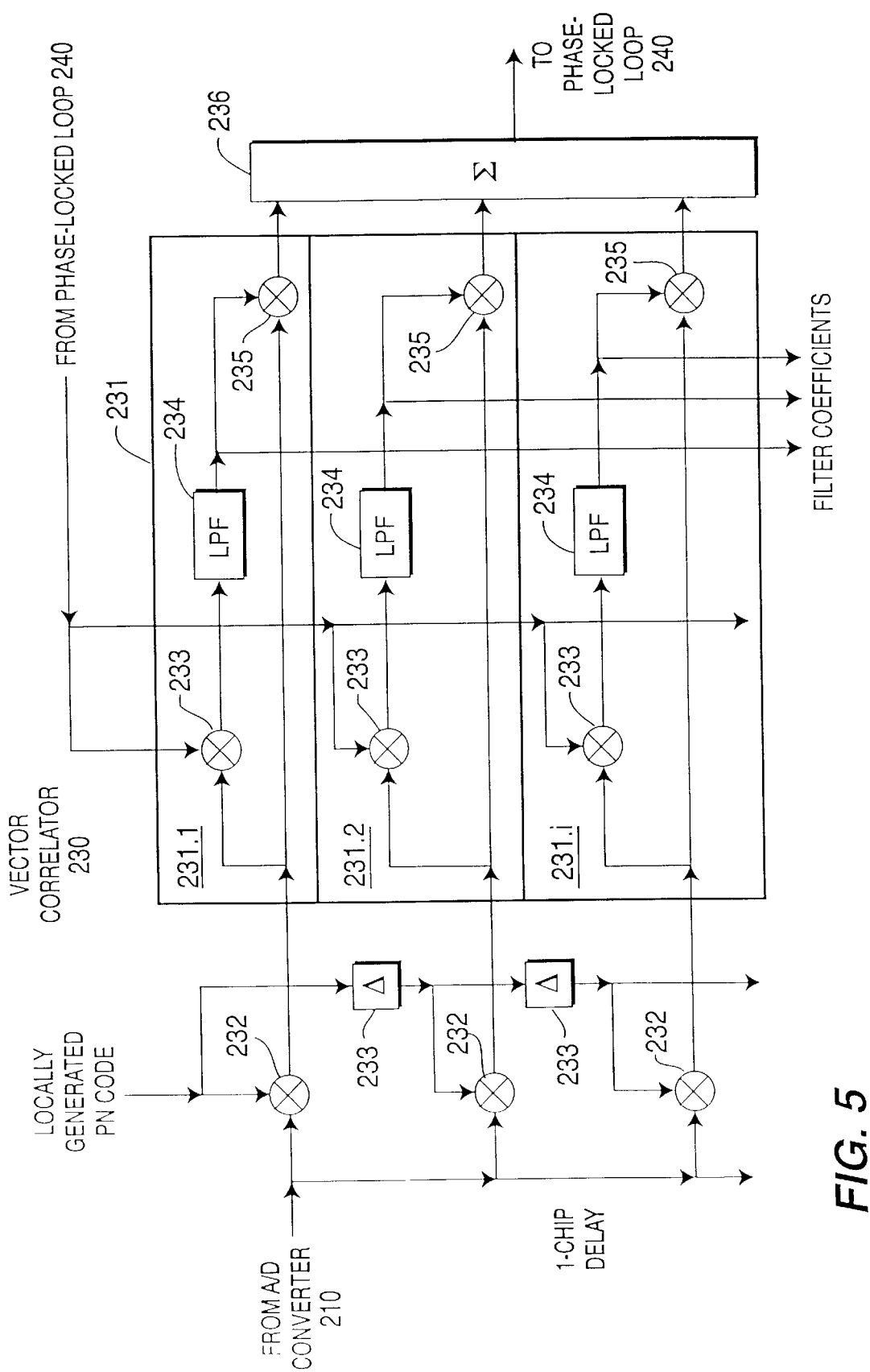
FIG. 5 is a schematic illustration of the vector correlator of the communication station shown in FIG. 4.

Referring to FIG. 5, the vector correlator 230 provides an estimate of the complex impulse response, having real and imaginary components, of the channel over which the communication signal is transmitted including the antenna array in the present invention. The vector correlator 230 has a plurality of independent elements 231.1, 231.2, 231i, preferably eleven, wherein the pilot pseudo random code input to each element is delayed by one chip to define a processing window of eleven chips.

Each element 231 performs an open loop estimation of the sampled impulse response of the RF channel. Thus, the vector correlator 230 produces noisy estimates of the sampled impulse response at evenly spaced intervals. The signal analysis performed by the vector correlator 230 accordingly determines phase and amplitude distortions occurring at different points within the processing window. Since known delays of three chips and seven chips have been imparted by delay units of 130a, 130b, the vector correlator will determine the existence of copies of the signal at chip zero, chip three and chip seven. Where the received signal also includes a five chip, for example, delayed replica attributable to natural multipath, the vector correlator will determine signal copies at zero, three, five, seven and eight chips. As will be recognized by those of ordinary skill in the art, providing the vector correlator with a wider window, for example, twenty-one chips, would result in the above example determining copies of the signal at zero, three, five, seven, eight and twelve. Preferably the vector correlator has a wide enough window to accommodate all of the delays imparted by the antennas within the antenna system 205. In the above example, if the vector correlator processing window is less than eleven, the signal received by antenna 120b will not be fully compensated for.

In operation, each element of the vector correlator 230 receives a locally generated pseudo random pilot code. The signal supplied to the vector correlator 230 from the analog digital converter 210 is input to each element. Mixers 232 mix the locally generated pseudo random code with the pilot to despread the pilot signal. Delay units 233 impart a one chip delay on the pilot code in all but one element 231. Each element 231 receives a carrier-offset-phase-correcting signal from phased lock loop 240, which is mixed with the despread pilot signal in each element 231 by mixers 233 to provide sample impulse response estimates. The vector correlator 230 further includes a plurality of low pass filters 234 which are connected to each mixer 233 and which smooth each corresponding sample impulse response estimate. The complex conjugates of each smoothed sampled impulse response estimate are used as the filter coefficients or weights for the adaptive match filter 250. In addition, the complex conjugate of each smoothed sampled response is mixed with the despread pilot signal by mixers 235. The summation unit 236 receives the outputs of mixers 235 and outputs the combined despread pilot signal which is now corrected for multipath distortion.

The carrier recovery phase lock loop 240 acts upon the despread pilot signal to estimate and correct the phase error due to RF carrier signal offset. The offset may be due to internal component mismatches or to channel distortion. Component mismatches between the subscriber oscillator and the receiver oscillator may cause slightly different oscillator outputs. These component mismatches can be further exacerbated by local and environmental conditions, such as the heating and cooling of electronic components, which may cause performance changes in the components. With respect to channel distortion, doppler effects caused by the motion of the receiving stations relative to the transmitter station or a multipath reflector may cause the RF carrier to become distorted during transmission. This may also result in a RF carrier offset.

The phase lock loop 240 is preferably implemented in a programmable digital signal processor. The phase lock loop 240 monitors the output of vector correlator 230 to estimate and correct for a phase error due to RF offset, thereby providing acceptable quality.

Figure 6:
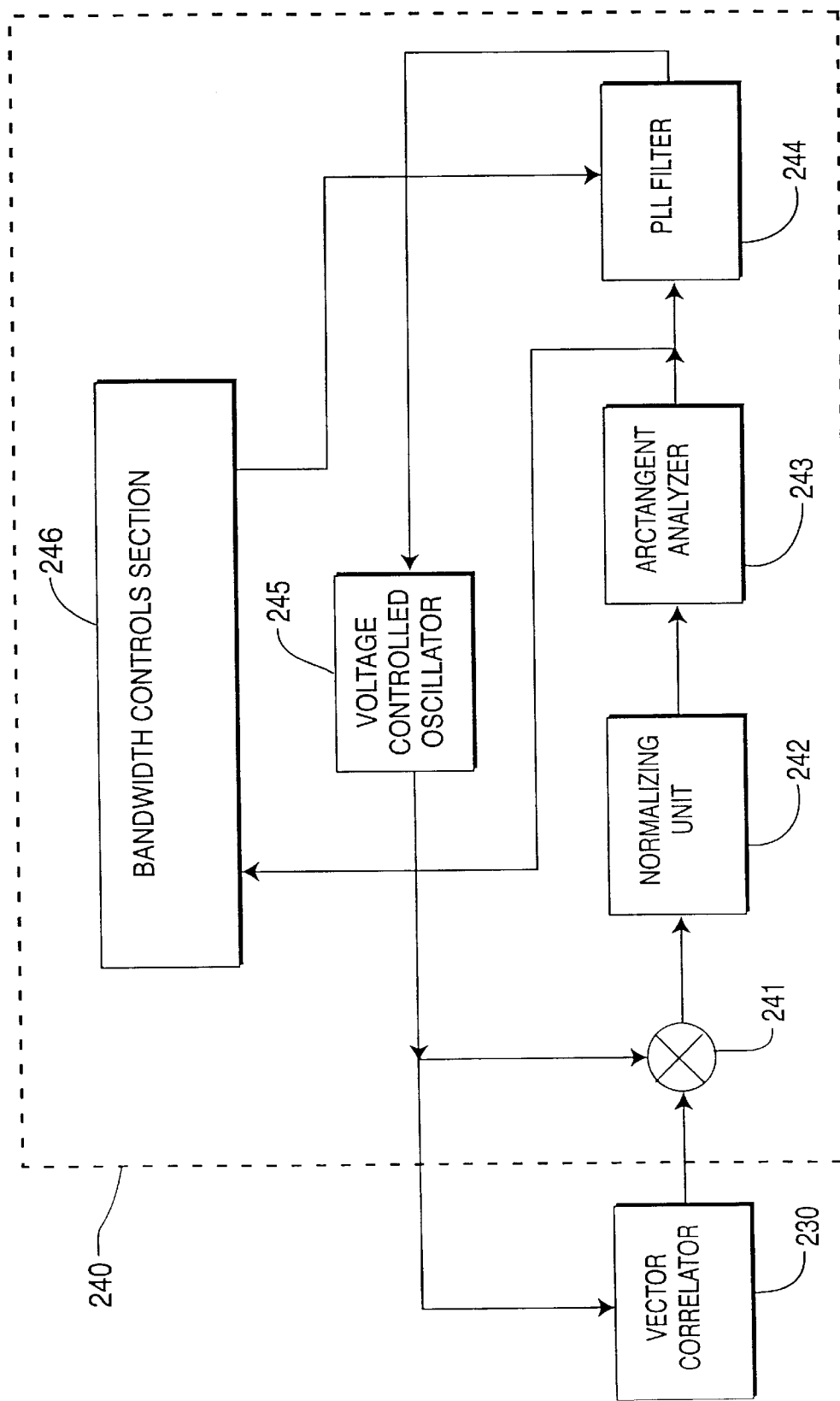
FIG. 6 is a schematic illustration of the phase locked loop of the communication station shown in FIG. 4.

Referring to FIG. 6, the continuously adjusted-bandwidth PLL comprises a mixer 241, a normalizing unit 242, and arctangent analyzer 243, a phased lock loop filter 244, a voltage controlled oscillator 245 and a bandwidth control section 246. The mixer 241 receives its input from the vector correlator 230 which is the despread pilot signal processed to correct for channel distortion due to multipath effects. The despread pilot signal is mixed with a correction signal from voltage controlled oscillator 245 to produce a complex error signal, which is transmitted to normalizing unit 242. The normalized signal is then input into arctangent analyzer 243. The output of the arctangent analyzer 243 is a quantized phase angle of the complex error signal. The bandwidth control section 246 continuously monitors the quantized phase error signal and generates a control signal to control the bandwidth of a phased lock loop filter 244. The signal output for the phased lock loop filter is transmitted to the voltage controlled oscillator 245. The voltage controlled oscillator 245 outputs a signal to mixer 241 and vector correlator 230, which is indicative of a carrier-offset phase-error. This entire process is repeated until a complex error signal output from the mixer 241 is at a minimum. Optimum performance of the modem 150 will not occur until the vector correlator 230 and phase lock loop 240 have reached a mutually satisfactory equilibrium point.

The vector correlator 230 outputs in conjunction with the carrier recovery phase lock loop 240 filter coefficients to the adaptive matched filter 250. The adaptive matched filter 250 is then able to process the communication signal to compensate for channel distortion due to both multipath effects and the antenna system. This compensation increases the gain of the signal by, in effect, overlaying delayed replicas of the signal. The adaptive matched filter 250 transmits the filtered resulting signal to the traffic despreaders 260 and auxiliary despreader 270. The APC 290 determines whether the signal strength of the transmitted signal should be increased or decreased to maintain an appropriate bit error rate based upon the estimate of the signal strength resulting from the traffic despreader 270. This information is transmitted from the communication station 200 to the station which transmitted the signal.

The traffic despreaders 260 transmit the despread filtered resultant signal to the Viterbi decoder 280 which function as described in copending application Ser. No. 08/871,008 which is incorporated by reference as if fully set forth of the convolutional encoder (not shown) of a subscriber unit 6. The Viterbi decoder 280 passes the resulting signal to a digital to analog converter 300 which provides for an output to the user. For data communications, a digital output may be provided.

Figure 7:
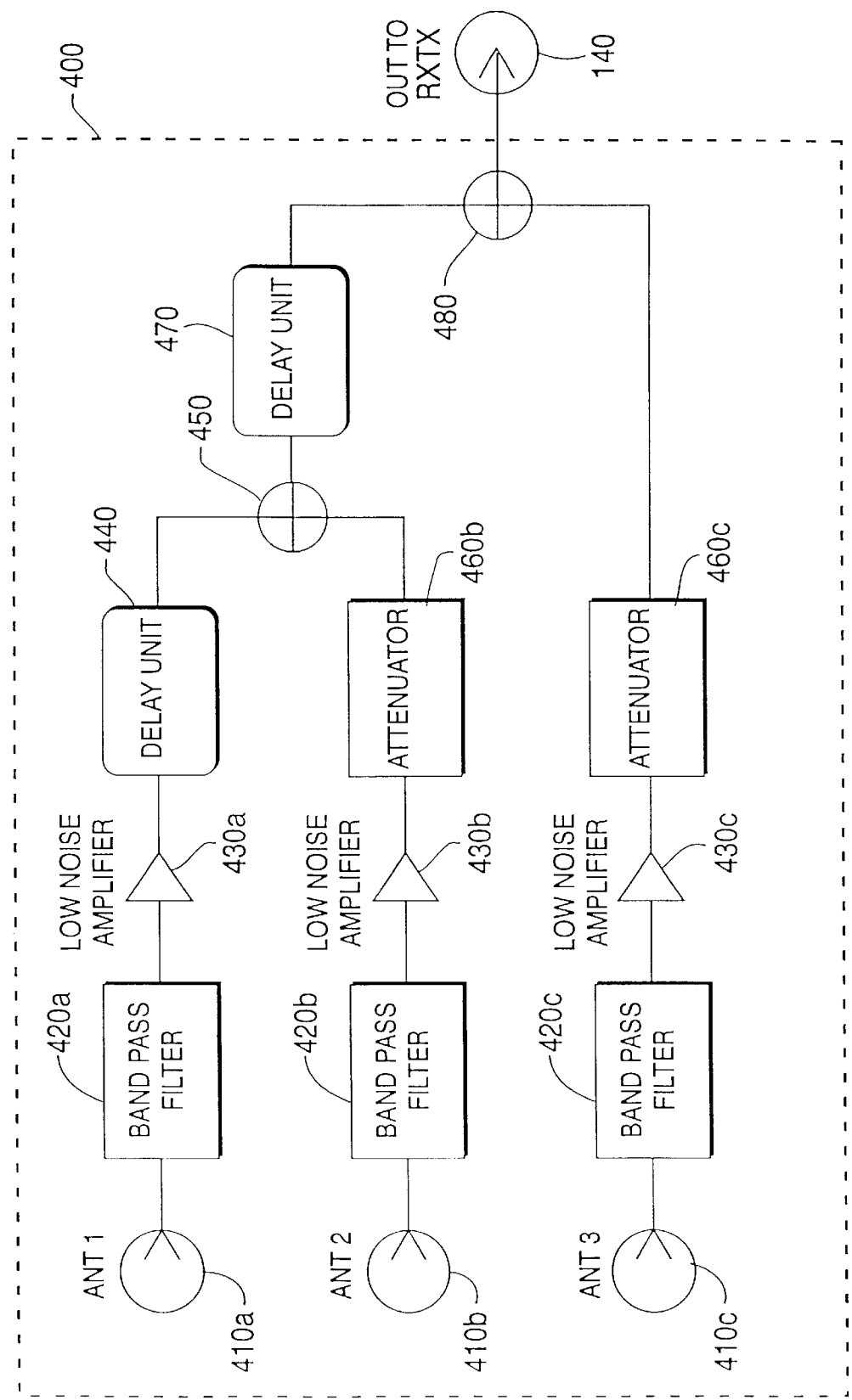
FIG. 7 is a block diagram of a second embodiment of a communication station made in accordance with the teachings of the present invention.

An alternative embodiment of the antenna system present invention is shown in FIG. 7. The antenna system 400 shown in FIG. 7 may be substituted for the antenna system 205 shown in FIG. 4. The antenna system 400 includes three antennas 410a, 410b, 410c. The first antenna 410a is coupled to a first summer 450 by way of a first bandpass filter 420a, a first low noise amplifier 430a and a first delay unit 440. A second antenna 410b is coupled to the first summer 450 by way of a second bandpass filter 420b, a second low noise amplifier 430b and a first attenuator 460b. The CDMA signals received by way of the first and second antennas 410a, 410b are summed by summer 450 are then passed to a second summer 480 by way of a delay unit 470. The third antenna 410c is coupled to the second summer 480 by way of a third bandpass filter 420c, a third low noise amplifier 430c and a second attenuator 460c. A CDMA signal received by the third antenna 410c is summed with the output of the delay unit 470. Accordingly, the antenna system 400 outputs a signal including a known distortion corresponding to the fixed delays imparted by the delay units 440 and 470. It should be recognized by those of skill in the art that this antenna system 400 achieves the same result as the antenna system 205 shown in FIG. 4.

Although the invention has been described in part by making detailed reference to certain specific embodiments, such detail is intended to be instructive rather than restrictive. It will be appreciated by those skilled in the art that many variations may be made in the structure and mode of operation without departing from the spirit and scope of the invention as disclosed in the teachings herein.

What is claimed is:

1. A CDMA base station comprising:
    a plurality of selectively spaced omnidirectional antennas, each for receiving CDMA communication signals within the operating range of the base station;
    a summer associated with said antennas and having an output for outputting a combined signal;
    a first of said antennas directly coupled to said summer;
    each subsequent antenna of said plurality of antennas associated with a respective delay unit, each respective delay unit being coupled to said summer and each respective delay unit imparting a different fixed delay to the signal received by the respective antenna, each fixed delay resulting in a delay of at least two chips relative to each other delay; the delayed signals being combined with the signal of said first antenna by said summer, said combined output signal having a known phase distortion corresponding to the fixed delays;
    a receiver coupled to the output of said summer; and
    a modem for receiving an individual communication signal associated with a unique CDMA code, said modem including distortion-compensating means for compensating for at least said known phase distortion.

2. The base station of claim 1 wherein said antenna system includes three antennas, a second of said antennas being associated with a first delay unit which imparts a first delay to the signal received by said second antenna, a third of said antennas being associated with a second delay unit which imparts a second delay to the signal received by said third antenna whereby said known phase distortion of said summer output corresponds to the predetermined delays imparted by said first and second delay units.

3. The base station of claim 2 wherein the delay imparted by said first delay unit results in a three chip delay and the delay imparted by said second delay unit results in a seven chip delay.

4. The base station of claim 3, wherein said modem includes a vector correlator for generating filter coefficients for an adaptive matched filter based on signal distortion determined by said vector correlator;
    said vector correlator having a processing capacity of at least eleven chips whereby said vector correlator compensates for said known distortion and for multipath distortion ascertainable within its processing capacity; and
    said adaptive matched filter processing communication signals with said unique CDMA code using coefficients generated by said vector correlator.

5. The base station of claim 4 wherein said modem further comprises an automatic power control unit associated with said adaptive match filter for generating a return power control signals for transmission.

6. The base station of claim 2 wherein said antennas are spaced at least six wavelengths apart from each other.

7. The base station of claim 2 wherein said antennas are spaced no more than three yards apart from each other.

8. The base station of claim 2 wherein said receiver and said modem are located in physically separate units and further comprising a cable for coupling said modem to said receiver, said cable providing power to said receiver.

9. The base station of claim 8 wherein said cable is at least 20 feet long.

10. A base station having an antenna system comprising:
    a plurality of single beam, omnidirectional antennas, each for receiving CDMA communication signals within the operating range of the base station;
    a summer associated with said antennas and having an output for outputting a combined signal;
    a first antenna of said plurality of antennas coupled to said summer;
    a first delay unit coupled to said summer and a second antenna of said plurality of antennas for delaying and outputting said CDMA communication signals from said second antenna;
    said summer combining said output from said first delay unit and said signals received by said first antenna, said combined signal comprising at least two copies of the received signal by said plurality of antennas; and
    a modem for receiving an individual communication signal associated with a unique CDMA code within said combined signal.

11. The base station of claim 10 further comprising a receiver coupled to said antenna system and said modem.

12. The base station of claim 11 wherein said combined signal further comprises a known distortion corresponding to at least said first fixed delay.

13. The base station of claim 12 wherein each of said plurality of antennas, except said first antenna, is associated with a respective delay unit which is coupled to said summer.

14. The base station of claim 13 wherein said known distortion of said combined signal corresponds to all of said delay units.

15. The base station of claim 14 wherein said receiver is a physically separate unit from said modem, and said base station further comprises a cable for coupling said modem to said receiver including power conductors for supplying power from said modem unit to said receiver unit.

16. The base station of claim 15 wherein said cable is at least 20 feet long.

17. The base station of claim 10 wherein said modem includes a vector correlator for generating filter coefficients for an adaptive matched filter based on signal distortion determined by said vector correlator;
    said vector correlator having a processing capacity at least equal to a predetermined chip delay corresponding to said known distortion whereby said vector correlator compensates for said known distortion and for multipath distortion ascertainable within its processing capacity; and
    said adaptive match filter processing individual communication signals associated with said unique CDMA code using coefficients generated by said vector correlator whereby increased signal gain is realized which is attributable in part to the compensation for said known distortion.

18. The base station of claim 17 wherein said modem further comprises an automatic power control unit associated with said adaptive match filter for generating power control signal for transmission.

19. The base station of claim 10 further comprising:
a plurality of modems coupled to said receiver, each modem for receiving an individual communication signal associated with a unique CDMA code, such that multiple communications received via said receiver can be simultaneously processed, each said modem including distortion compensating means for compensating for at least said known signal distortion.

20. An antenna system for use in a CDMA base station comprising:
first, second and third single beam, omnidirectional antennas; each for receiving CDMA communication signals within the operating range of the base station;
a first summer coupled to said first and second antennas, for combining said signals received by said first and second antennas, whereby said combined signal comprises two copies of the received signal;
said first antenna coupled to said summer by way of a first delay unit;
a second summer coupled to said first summer by way of a second delay unit, and coupled to said third antenna, for combining signals received by said third antenna with said combined signal output by said first summer and outputting a second combined signal; and
a modem for detecting an individual communication signal associated with a unique CDMA code within said second combined signal.

21. An antenna system for use in a base station comprising:
a plurality of selectively spaced omnidirectional antennas, each for receiving CDMA communication signals within the range of the system;
a summer associated with said antennas and having an output for outputting a combined signal;
a first of said antennas directly coupled to said summer;
each subsequent antenna of said plurality of antennas associated with a respective delay unit, each respective delay unit being coupled to said summer and each respective delay unit imparting a different fixed delay to the signal received by the respective antenna, each fixed delay resulting in a delay of at least two chips relative to each other delay; the delayed signals being combined with the signal of said first antenna by said summer, said combined output signal having a known phase distortion corresponding to the fixed delays; and
a modem for receiving an individual communication signal associated with a unique CDMA code, said modem including distortion-compensating means for compensating for at least said known phase distortion.

22. The antenna system of claim 21 further including three antennas, a second of said antennas being associated with a first delay unit which imparts a first delay to the signal received by said second antenna, a third of said antennas being associated with a second delay unit which imparts a second delay to the signal received by said third antenna, whereby said known phase distortion of said summer output corresponds to the delays imparted by said first and second delay units.

23. The antenna system of claim 22 wherein the delay imparted by said first delay unit results in a three chip delay and the delay imparted by said second delay unit results in a seven chip delay.

24. The antenna system of claim 23 wherein:
said modem includes a vector correlator for generating filter coefficients for an adaptive matched filter based on signal distortion determined by said vector correlator;
said vector correlator having a processing capacity of at least eleven chips whereby said vector correlator compensates for said known distortion and for multipath distortion ascertainable within its processing capacity; and
said adaptive match filter processing communication signals with said unique CDMA code using coefficients generated by said vector correlator.

* * * * *